US011319448B2

(12) United States Patent
Dahlstrand et al.

(10) Patent No.: US 11,319,448 B2
(45) Date of Patent: May 3, 2022

(54) CONTINUOUS PRODUCTION OF FUEL GRADE HYDROCARBONS BY HYDROTREATMENT OF FUNCTIONALIZED LIGNIN (71) Applicant: REN FUEL K2B AB, Stockholm (SE)

(72) Inventors: Christian Dahlstrand, Uppsala (SE); Joseph Samec, Stockholm (SE)

(73) Assignee: REN FUEL K2B AB, Stockholm (SE)

( * ) Notice: Subject to any disclaimer, the term of this patent is extended or adjusted under 35 U.S.C. 154(b) by 0 days.

(21) Appl. No.: 16/495,229

(22) PCT Filed: Mar. 20, 2018

(86) PCT No.: PCT/SE2018/050282
§ 371 (c)(1),
(2) Date: Sep. 18, 2019

(87) PCT Pub. No.: WO2018/174793
PCT Pub. Date: Sep. 27, 2018

(65) Prior Publication Data
US 2020/0109286 A1    Apr. 9, 2020

(30) Foreign Application Priority Data
Mar. 22, 2017    (SE) .................... 1750346-7

(51) Int. Cl.
C08L 97/00       (2006.01)
C07G 1/00        (2011.01)
C10G 3/00        (2006.01)

(52) U.S. Cl.
CPC .............. *C08L 97/005* (2013.01); *C07G 1/00* (2013.01); *C10G 3/46* (2013.01);
(Continued)

(58) Field of Classification Search
CPC ...................... C08L 97/005; C10G 2300/1014
See application file for complete search history.

(56) References Cited

U.S. PATENT DOCUMENTS 4,420,644 A * 12/1983 Huibers ................. C10G 1/083
568/806
7,994,375 B2    8/2011 Marker
(Continued)

FOREIGN PATENT DOCUMENTS

GB    2104545 A    3/1983
WO    WO-2008/157164 A1    12/2008
(Continued)

OTHER PUBLICATIONS

Cheveron (Diesels Fuels Technical Review, 2007) (Year: 2007).*
International Search Report PCT/ISA/210 for International Application No. PCT/SE2018/050282 dated Mar. 20, 2018.

*Primary Examiner* — Liam J Heincer
(74) *Attorney, Agent, or Firm* — Harness, Dickey & Pierce, P.L.C.

(57)    ABSTRACT

The present invention relates to a composition and a method of preparing the composition where the composition comprising functionalized lignin having a weight average molecular weight ($M_w$) of at least 1,000 g/mol and a green carrier liquid comprising depolymerized functional lignin, wherein the functionalized lignin is dissolved in the green carrier liquid and wherein the amount of depolymerized functionalized lignin compounds in the composition is higher than the amount of functionalized lignin.

10 Claims, 4 Drawing Sheets (52) U.S. Cl.
 CPC . *C10G 2300/1014* (2013.01); *C10G 2400/02* (2013.01); *C10G 2400/04* (2013.01)

(56) References Cited

U.S. PATENT DOCUMENTS

| | | | | |
|---|---|---|---|---|
| 9,920,201 | B2* | 3/2018 | Samec | C10L 1/04 |
| 10,030,147 | B2* | 7/2018 | Samec | C10L 1/026 |
| 10,150,790 | B2* | 12/2018 | Samec | C10L 1/02 |
| 10,611,884 | B2* | 4/2020 | Samec | C08L 97/005 |
| 10,676,688 | B2* | 6/2020 | Dahlstrand | C08H 6/00 |
| 10,851,245 | B2* | 12/2020 | Samec | C08L 23/06 |
| 2013/0025191 | A1 | 1/2013 | Chen et al. | |
| 2016/0312029 | A1* | 10/2016 | Samec | C08H 6/00 |
| 2017/0298192 | A1* | 10/2017 | Samec | C09J 197/005 |
| 2018/0142177 | A1* | 5/2018 | Dahlstrand | C10G 3/42 |
| 2018/0265794 | A1* | 9/2018 | Dahlstrand | C10G 3/50 |
| 2020/0231879 | A1* | 7/2020 | Chauhan | C10G 47/00 |

FOREIGN PATENT DOCUMENTS

| | | |
|---|---|---|
| WO | WO-2011/003029 A2 | 1/2011 |
| WO | WO-2014/116173 A1 | 7/2014 |
| WO | WO-2015/094098 A1 | 6/2015 |
| WO | WO-2016/204682 A1 | 12/2016 |

\* cited by examiner

CONTINUOUS PRODUCTION OF FUEL GRADE HYDROCARBONS BY HYDROTREATMENT OF FUNCTIONALIZED LIGNIN

CROSS-REFERENCE TO RELATED APPLICATIONS

This application is a national phase under 35 U.S.C. § 371 of PCT International Application No. PCT/SE2018/050282 which has an International filing date of Mar. 20, 2018, which claims priority to Swedish patent application number SE 1750346-7 filed Mar. 22, 2017.

FIELD OF THE INVENTION

The present invention relates to a composition and a method of preparing the composition where the composition comprises functionalized lignin dissolved in lignin derived hydrotreated compounds. The method may be operated in batch mode or in a continuous mode.

BACKGROUND

There is an increasing interest in using biomass as a source for fuel production. Biomass includes, but is not limited to, plant parts, fruits, vegetables, processing waste, wood chips, chaff, grain, grasses, corn, corn husks, weeds, aquatic plants, hay, paper, paper products, recycled paper and paper products, lignocellulosic material, lignin and any cellulose containing biological material or material of biological origin.

An important component of biomass is the lignin present in the solid portions of the biomass. Lignin comprises chains of aromatic and oxygenate constituents forming larger molecules that are not easily treated. A major reason for the difficulty in treating the lignin is the inability to disperse or dissolve the lignin for contact with catalysts that can break down the lignin.

Lignin is one of the most abundant natural polymers on earth. One common way of preparing lignin is by separation from wood during pulping processes. Only a small amount (1-2%) is utilized in specialty products whereas the rest primary serves as fuel. Even if burning lignin is a valuable way to reduce usage of fossil fuel, lignin has significant potential as raw material for the sustainable production of chemicals and liquid fuels.

Various lignins differ structurally depending on raw material source and subsequent processing, but one common feature is a backbone consisting of various substituted phenyl propane units that are bound to each other via aryl ether or carbon-carbon linkages. They are typically substituted with methoxyl groups and the phenolic and aliphatic hydroxyl groups provide sites for e.g. further functionalization.

Today lignin may be used as a component in for example pellet fuel as a binder but it may also be used as an energy source due to its high energy content. Lignin has higher energy content than cellulose or hemicelluloses and one gram of lignin has on average 22.7 KJ, which is 30% more than the energy content of cellulosic carbohydrate. The energy content of lignin is similar to that of coal. Today, due to its fuel value lignin that has been removed using the kraft process, sulphate process, in a pulp or paper mill, is usually burned in order to provide energy to run the production process and to recover the chemicals from the cooking liquor.

There are several ways of separating lignin from black or red liquor obtained after separating the cellulose fibres in the kraft or sulphite process respectively, during the production processes. One of the most common strategies is ultrafiltration. Lignoboost® is a separation process developed by Innventia AB and the process has been shown to increase the lignin yield using less sulphuric acid. In the Lignoboost® process, black liquor from the production processes is taken and the lignin is precipitated through the addition and reaction with acid, usually carbon dioxide ($CO_2$), and the lignin is then filtered off. The lignin filter cake is then re-dispersed and acidified, usually using sulphuric acid, and the obtained slurry is then filtered and washed using displacement washing. The lignin is usually then dried and pulverized in order to make it suitable for lime kiln burners or before pelletizing it into pellet fuel.

Biofuel, such as biogasoline and biodiesel, is a fuel in which the energy is mainly derived from biomass material or gases such as wood, corn, sugarcane, animal fat, vegetable oils and so on. However the biofuel industries are struggling with issues like food vs fuel debate, efficiency and the general supply of raw material. At the same time the pulp or paper making industries produces huge amounts of lignin which is often, as described above, only burned in the mill. Two common strategies for exploring biomass as a fuel or fuel component are to use pyrolysis oils or hydrogenated lignin.

In order to make lignin more useful as a source for fuel production one has to solve the problem with the low solubility of lignin in organic solvents. One drawback of using lignin as a source for fuel production is the issue of providing lignin in a form suitable for hydrotreaters or crackers. The problem is that lignin is not soluble in oils or fatty acids which is, if not necessary, highly wanted.

Prior art provides various strategies for degrading lignin into small units or molecules in order to prepare lignin derivatives that may be processed. These strategies include hydrogenation, dexoygenation and acid catalyst cleaving. WO2011003029 relates to a method for catalytic cleavage of carbon-carbon bonds and carbon-oxygen bonds in lignin. US20130025191 relates to a depolymerisation and deoxygenation method where lignin is treated with hydrogen together with a catalyst in an aromatic solvent. All these strategies relates to methods where the degradation is performed prior to eventual mixing in fatty acids or gas oils. WO2008157164 discloses an alternative strategy where a first dispersion agent is used to form a biomass suspension to obtain a better contact with the catalyst. These strategies usually also requires isolation of the degradation products in order to separate them from unwanted reagents such as solvents or catalysts.

The direct treatment of lignin at present day refineries has not yet been realized. This has mainly to do with compatibility issues as the physical properties of lignin are very different as compared to the standard refinery oil feeds.

Producing pyrolysis oils or synthesis gas from biomass is however possible and has been done both in Sweden and elsewhere. The production can be via pyrolysis of black liquor or biomass in an oil based slurry. However, refineries cannot handle the corrosive pyrolysis oils and the syngas products methanol, which is poisonous, and dimethyl ether (DME), which is gaseous, cannot be used in currents automobile engines.

A variety of fats and greases derived from biomass have already found their way into everyday fuels (Hydrogenated vegetable oil (HVO)). Some of the companies that actively use these raw materials are Preem (Evolution Diesel®), Neste (NexBTL®), and ENI (Ecofining™ process). The use of tall oil is not controversial as it is a forestry byproduct. Use palm oil in the production of "green" fuels has received unwanted attention from Green Peace because palm oil is associated with the destruction of the rainforests. ENI uses first generation vegetable oils in their production of green fuels, however, their feedstock production clashes with the production of food.

When focusing on the lignin part of biomass there are several different strategies for producing liquid fuels. One of the main strategies to make a feedstock for oil refineries is to perform lignin depolymerization. However, many of the monomeric lignin units generated in this way are not soluble in standard refinery carrier oils, as shown in WO2014116173. An alternative strategy is through lignin hydrotreatment. Much of the research into lignin hydrotreating has been focused on lignin model compounds. The few reports where actual lignin is used show that lignin can be hydrotreated in the presence of conventional catalysts in a batch setup under solvent-free conditions or with solvent. Solvent-free conditions may be problematic to use for continuous industrial hydrotreatment as the lignin powder would need to be transported into a reactor at high gas pressures. However, using methanol, a report shows that "under optimal reaction conditions, the main products are alkylphenolics and gratifyingly no ring hydrogenation or char formation takes place".

Today only the HVO is believed to have successfully been commercialized as fuel. The feedstock limitations (tall oil) or the detrimental environmental effects (palm oil) will continue to be issues for the production of green fuels from biomass oils. There is a need to find reliable, economical ways to use renewable biomass to produce liquid fuels. One such way has been developed by RenFuel AB. They convert lignin into a lignin oil, Lignol® which is soluble in gas oils for example used for hydrotreating.

An alternative procedure for making liquid fuels is by performing hydrotreatment of solid lignin dispersed in hydrocarbon oil. U.S. Pat. No. 7,994,375 discloses a method of converting biomass such as lignin into liquid fuel. The method comprises forming a slurry of lignin and a carrier oil (Tall oil for example) which is hydrotreated into diesel or naphtha boiling range products. The disclosed process aims at fully deoxygenate the lignin. There are however some obvious issues with having a slurry, including sedimentation, pumping problems and loss in reactivity. Also the catalyst activity may be hampered by the large slurry particles. Using hydrotreated pyrolysis oil as a carrier liquid comes with the problem of corrosion since pyrolysis oils have a pH of 2-3 which may result in release of metals which in turn damage the catalysts.

GB2104545 discloses a process where a slurry of lignin is treated in a hydrocracking reactor. The process results in an oil (slurrying oil) which is mixed with the lignin to prepare a pumpable slurry mixture. The slurry mixture is then introduced into a cracking reactor where the catalyst is provided in particulate form. A problem with using a slurry is that a fixed bed catalyst cannot be used and it is only the lignin in solution that is hydrotreated i.e. the particulate lignin is not or only poorly hydrotreated.

Some of the problems associated with the hydrotreatment of lignin which need solving to become industrially interesting are:

Lignin does not significantly dissolve in carrier liquids
Expensive to use standard solvents as carrier liquids, i.e. methanol
Using vegetable oils is too often associated with either destruction of rainforest to produce palm oil or competition with food to produce vegetable oils.

SUMMARY OF THE INVENTION

The aim of the present invention is to overcome the drawbacks of the prior art and provide a composition comprising functionalized lignin at least partly dissolved in depolymerized functionalized lignin compounds. The present invention further aims at presenting a novel method of preparing green light products. One application for the composition may be as a raw material for fuel production (e.g. petrol or diesel) or as an additive to fuel or oil or as a starting material for the chemical industry.

Enabling the use of a fixed bed reactor will solve many issues as the functionalized lignin may contain relatively high amounts of metals, as compared to a distilled mineral oil, the reactor might need a guard bed. As a consequence of the high oxygen content in functionalized lignin the fixed bed reactor can handle the exothermic reaction of water formation by having low activity on the first bed followed by beds with more active catalyst. In addition the dissolved functionalized lignin enables the use of lower temperature and lower hydrogen pressure as compare to having the lignin in a slurry. Furthermore by dissolving the functionalized lignin in a carrier liquid or in suitable solvents commercially available and standard hydrotreater reactors and system may be used to treat the lignin instead of specifically designed hydrotreaters.

In a first aspect the present invention relates to a composition comprising functionalized lignin having a weight average molecular weight ($M_w$) of at least 1,000 g/mol and a green carrier liquid comprising depolymerized functionalized lignin compounds, wherein the functionalized lignin is at least partly dissolved in the green carrier liquid and wherein the amount of depolymerized functionalized lignin compounds in the composition is higher than the amount of functionalized lignin.

In one embodiment the composition is as defined in claim 1.

In a second aspect the present invention relates to a method of preparing the composition according to the present invention wherein the method comprises:

a. providing a first feed of functionalized lignin having a weight average molecular weight ($M_w$) of at least 1,000 g/mol;

b. providing a solvent or a green carrier liquid or a mixture thereof which at least partly dissolve the functionalized lignin;

c. at least partly dissolving the functionalized lignin in the solvent or green carrier liquid forming a first feed composition;

d. hydrotreating or partially hydrotreating the first feed composition forming a first product stream comprising light compounds and heavy compounds;

e. dividing the first product stream into a second product stream and a third product stream;

f. optionally removing unwanted compounds such as coke and solid particles from the second and/or third product stream;

g. providing a green carrier liquid comprising the second product stream and optionally a solvent such as a carrier liquid;

h. providing a second feed of functionalized lignin; and mixing the green carrier liquid with the second feed of functionalized lignin forming the composition.

In one embodiment the method comprises a. providing a first feed of functionalized lignin having a weight average molecular weight ($M_w$) of at least 1,000 g/mol wherein the functionalized lignin is functionalized with an alkyl containing group via linker group wherein the linker is an ether or an ester and;
b. providing a solvent or a green carrier liquid or a mixture thereof which at least partly dissolve the functionalized lignin;
c. dissolving the functionalized lignin in the solvent or green carrier liquid forming a first feed composition;
d. hydrotreating or partially hydrotreating the first feed composition forming a first product stream comprising light compounds and heavy compounds, preferably in a fixed bed hydrotreater;
e. dividing the first product stream into a second product stream and a third product stream;
f. optionally removing unwanted compounds such as coke and solid particles from the second and/or third product stream;
g. providing a green carrier liquid comprising the second product stream and optionally a solvent such as a carrier liquid, wherein the green carrier liquid comprises depolymerized functionalized lignin compounds comprising petrol and diesel compounds in an amount of at least 5 wt %
h. providing a second feed of functionalized lignin; and
i. mixing the green carrier liquid with the second feed of functionalized lignin forming the composition.

In a third aspect the present invention relates to an intermediate composition comprising functionalized lignin having a weight average molecular weight ($M_w$) of 1,000 g/mol dissolved in depolymerized functionalized lignin compounds. The depolymerized functionalized lignin compounds may be a mixture comprising phenol derivatives and polyphenol derivatives such as an alkylphenol, an alkyl alkoxyphenol or an alkoxyphenol and a diphenol.

In one embodiment the intermediate comprises functionalized lignin having a weight average molecular weight ($M_w$) of at least 1,000 g/mol and green carrier liquid comprising depolymerized functionalized lignin compounds and wherein the depolymerized functionalized lignin compounds comprises petrol and diesel compounds in an amount of at least 5 wt %, wherein the functionalized lignin is functionalized with an alkyl containing group via linker group wherein the linker is an ether or an ester and wherein the functionalized lignin is dissolved in the green carrier liquid and wherein the amount of depolymerized functionalized lignin compounds in the composition is higher than the amount of functionalized lignin.

In a fourth aspect the present invention relates to a fuel grade hydrocarbon composition obtained by the method according to the present invention.

All the embodiments described herein are applicable to all the aspects unless stated otherwise.

DETAILED DESCRIPTION OF THE INVENTION

The present invention relates to a composition for use in a refinery processes for the production of various fuels or chemicals.

In the present application the term "lignin" means a polymer comprising coumaryl alcohol, coniferyl alcohol and sinapyl alcohol monomers.

In the present application the term "carrier liquid" means a liquid selected from fatty acids or mixture of fatty acids, esterified fatty acids, rosin acid, crude oil, mineral oil, bunker fuel and hydrocarbon oils or mixtures thereof.

In the present invention the term "oil" means a nonpolar chemical substance that is a viscous liquid at ambient or higher temperature and is both hydrophobic and lipophilic.

In the present application the terms "red liquor" and "brown liquor" denote the same liquor.

In the present invention the term "hydrogen donor" should be interpreted as a substance or compound that gives or transfers hydrogen atoms to another substance or compound.

For the purpose of this application the term "membrane filtration" shall include both cross-flow and dead-end flow modes by the use of porous membranes or filters.

In the present application the terms "green carrier liquid" and "green carrier oil" denotes the same thing and are used interchangeably.

In the present application the term "functionalized lignin" denotes lignin that has been modified or functionalized with an alkyl containing group via linker. Non-limiting examples are disclosed in WO2016204682.

Figure 1:
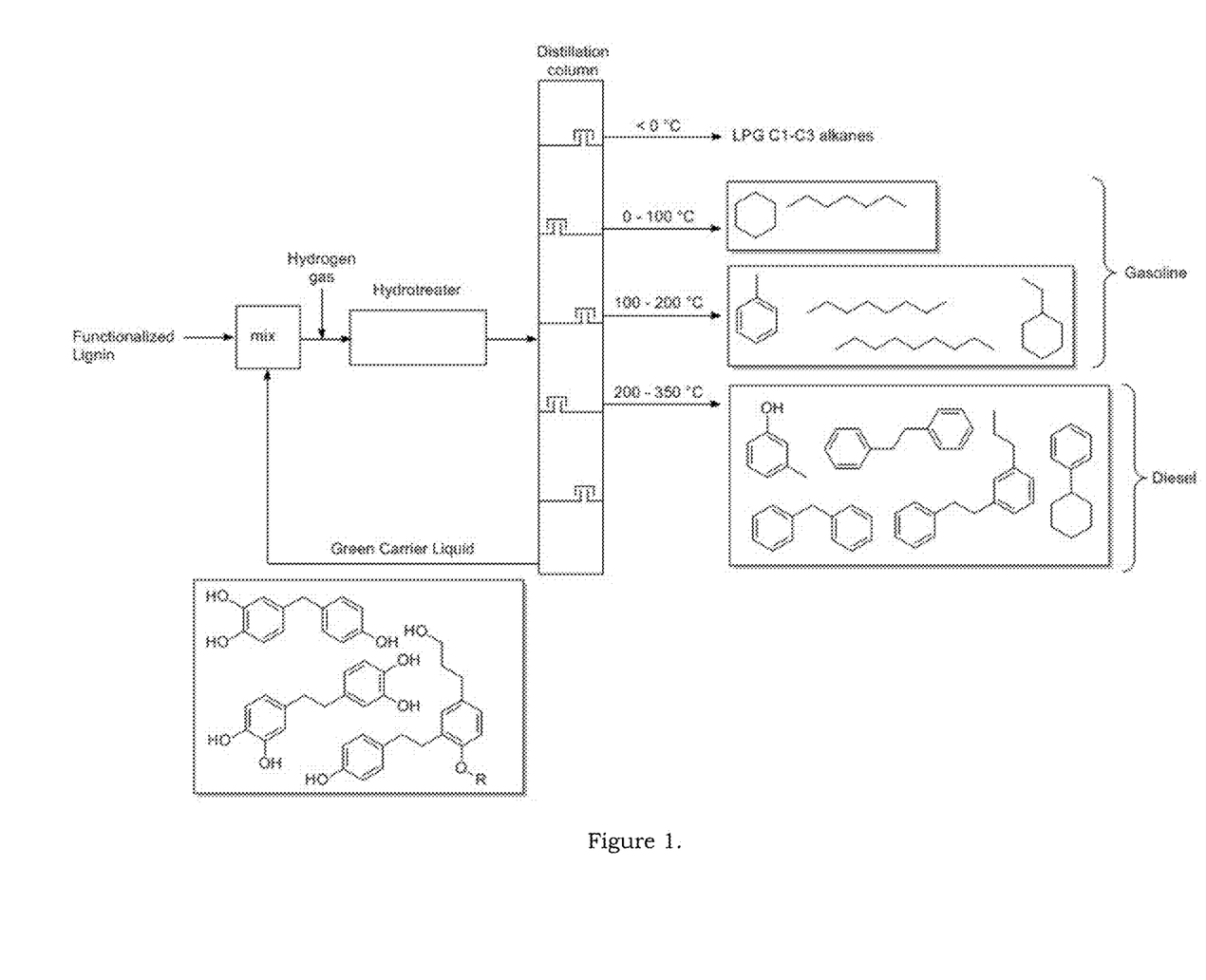
FIG. 1, a schematic overview of the present invention. The compounds that are found at the upper part of the column are smaller and contain less oxygen than compounds further down the column.

Oil refineries cannot use lignin as feedstock in current hydrotreaters as lignin does not dissolve in standard carrier oil. Instead the present invention relates to formulate functionalized lignin in depolymerized functionalized lignin compounds that has been obtained by partly hydrotreating the functionalized lignin and which will serve as carrier liquid (green carrier liquid) for a hydrotreater replacing the gas oil (FIG. 1). The depolymerized functionalized lignin compounds may be prepared by hydrotreatment, hydrothermal treatment, hydrothermal cracking or solvolysis or any combination thereof.

Figure 2:
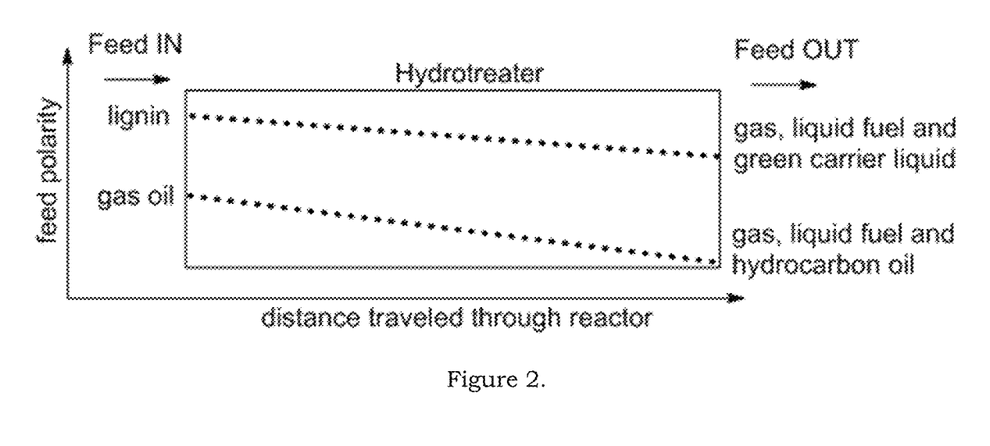
FIG. 2, the effect on polarity during hydrotreatment.

There are two different processes in the hydrotreatment which are intimately related as they both involve the cleavage of C—O bonds; depolymerization and hydrophobization. The depolymerization is mostly a consequence of ether bond cleavages while hydrophobization is associated with the removal of hydroxyl-groups. The starting material lignin is polar, while completely deoxygenated compounds, i.e. pure hydrocarbons are non-polar. The polarity of the feed changes as it goes through the hydrotreater and becomes less polar (FIG. 2). The feed also becomes smaller through the process of depolymerization.

One object of the present invention is to develop a new method to enable the formulation of functionalized lignin into green carrier oils or liquids which can be pumped into conventional hydrotreaters for conversion into green light products. The green carrier oil is produced by the partial deoxygenation of functionalized lignin through hydrotreatment or by hydrothermal treatment or hydrothermal cracking or solvolysis or any combination thereof.

Unlike U.S. Pat. No. 7,994,375 the present invention is not dependent on further addition of a carrier liquid and solves another problem which is to form a solution of lignin (functionalized lignin) where the lignin is dissolved in hydrotreated lignin compounds. The present invention does not aim at fully deoxygenate the functionalized lignin only to the extent that it dissolves lignin.

The method according to the present invention may be a continuous process or a batch Process.

The Composition

The composition according to the present invention comprises functionalized lignin and a green carrier liquid comprising depolymerized functionalized lignin compounds. The functionalized lignin is at least partly dissolved in the green carrier liquid.

Functionalized Lignin

In order to obtain lignin biomass may be treated in any suitable way known to a person skilled in the art. The biomass may be treated with pulping processes or organosols processes for example. Biomass includes, but is not limited to wood, fruits, vegetables, processing waste, chaff, grain, grasses, corn, corn husks, weeds, aquatic plants, hay, paper, paper products, recycled paper, shell, brown coal, algae, straw, bark or nut shells, lignocellulosic material, lignin and any cellulose containing biological material or material of biological origin. In one embodiment the biomass is wood, preferably particulate wood such as saw dust or wood chips. The wood may be any kind of wood, hard or soft wood, coniferous tree or broad-leaf tree. A non-limiting list of woods would be pine, birch, spruce, maple, ash, mountain ash, redwood, alder, elm, oak, larch, yew, chestnut, olive, cypress, banyan, sycamore, cherry, apple, pear, hawthorn, magnolia, sequoia, walnut, karri, coolabah and beech.

It is preferred that the biomass contains as much lignin as possible. The Kappa number estimates the amount of chemicals required during bleaching of wood pulp in order to obtain a pulp with a given degree of whiteness. Since the amount of bleach needed is related to the lignin content of the pulp, the Kappa number can be used to monitor the effectiveness of the lignin-extraction phase of the pulping process. It is approximately proportional to the residual lignin content of the pulp.

$$K \approx c*l$$

K: Kappa number; c: constant 6.57 (dependent on process and wood); l: lignin content in percent. The Kappa number is determined by ISO 302:2004. The kappa number may be 20 or higher, or 40 or higher, or 60 or higher. In one embodiment the kappa number is 10-100.

The biomass material may be a mixture of biomass materials and in one embodiment the biomass material is black or red liquor, or materials obtained from black or red liquor. Black and red liquor contains cellulose, hemi cellulose and lignin and derivatives thereof and cooking chemicals. The composition according to the present invention may comprise black or red liquor, or lignin obtained from black or red liquor.

Black liquor comprises four main groups of organic substances, around 30-45 weight % ligneous material, 25-35 weight % saccharine acids, about 10 weight % formic and acetic acid, 3-5 weight % extractives, about 1 weight % methanol, and many inorganic elements and sulphur. The exact composition of the liquor varies and depends on the cooking conditions in the production process and the feedstock. Red liquor comprises the ions from the sulfite process (calcium, sodium, magnesium or ammonium), sulfonated lignin, hemicellulose and low molecular resins.

The lignin according to the present invention may be Kraft lignin, sulfonated lignin, Lignoboost® lignin, precipitated lignin, filtrated lignin, soda lignin, acetosolv lignin or organosolv lignin. In one embodiment the lignin is Kraft lignin, acetosolv lignin or organosolv lignin. In another embodiment the lignin is Kraft lignin. In another embodiment the lignin is organosolv lignin. In another embodiment the lignin obtained as residual material from ethanol production. The lignin may be when added in particulate form have a particle size of 5 mm or less, or 1 mm or less, or 500 μm or less, or 300 μm or less.

A problem with lignin, native lignin or Kraft lignin for example, is that it is not soluble in most organic solvents, fatty acids or oils. Instead prior art have presented various techniques to depolymerize and covert lignin into components soluble in the wanted media.

One of the mildest ways of attaining lignin from wood is by organosolv pulping. Through this method the lignin retains much of its native structure with many ether bonds. This makes organosolv lignin easy to depolymerize and deoxygenate. Unlike organosolv lignin Kraft lignin is harshly processed in order to remove much lignin from the cellulose fibres in the Kraft process. Through the Kraft process the native lignin is destroyed and recondensed into Kraft lignin which is very resilient towards chemical treatment. The chemical bonds in Kraft lignin are more difficult to cleave as compared to organosolv lignin. Reviewing the recent literature on lignin catalysis much of the work is focused on organosolv lignin as this lignin is much more effected by catalysis as compared to Kraft lignin. Even if the use of organosolv lignin in hydrotreating is easier there is much more Kraft lignin available than organosolv lignin making Kraft lignin a more interesting source.

The lignin according to the present invention is modified or functionalized with an alkyl containing group. The method of modification is further disclosed in WO2016/204682 which is hereby incorporated by reference.

The alkyl containing group may be but is not limited to an alkyl group, an alkyl ester, an alkyl ether or any other group comprising an alkyl group or section or block The alkyl containing group is connected to the lignin via a linker group which is derived from a hydroxyl group or connected to an aryl group on the lignin according to the following schematic chemical structures:

where the lignin is schematically represented by the R" and the aryl (structure 1 and 2) or aliphatic (structure 3) groups respectively, L and L' are the linkers and R and R' are the alkyl containing groups. Since lignin has aliphatic hydroxyl groups as well as aromatic hydroxyl groups the linker L may be at an aliphatic part of lignin (structure 3). The linker L' may also be connected direct to the aryl group in lignin, i.e. not via a hydroxyl group (structure 2). R" may be hydrogen, alkyl, aryl or alkoxy group or any other group found in lignin. The aryl group of the lignin may comprise more than one R".

The linker (L) may be an ether, ester, ketone, acetal, methylene, methyne, olefin, amide, thioester, thioether, imide, imide amide, carbamate, carbamothioic acid, sulfonyl, sulfonamide, silyl oxy, silyl ether, phenoxide, furan, phosphorous acid, quaternary ammonium or hetero cycles. In one embodiment the linker is ether. In one embodiment the linker is ester. In one embodiment the linker is ketone. In one embodiment the linker is acetal. In one embodiment the linker is methylene. In one embodiment the linker is methyne. In one embodiment the linker is olefin. In one embodiment the linker is amide. In one embodiment the linker is thioester. In one embodiment the linker is thioether. In one embodiment the linker is imide. In one embodiment the linker is imide amide. In one embodiment the linker is sulfonyl. In one embodiment the linker is quaternary ammonium. In one embodiment the linker L' is a ketone. In one embodiment the linker L' is an aldehyde. Depending on the linking group and the linking agent the linker may be connected to the lignin chain at different parts such as via hydroxyl groups or the aryl groups.

In one embodiment the lignin is modified with alkyl containing groups and where some of the alkyl containing groups are linked to the lignin via an ether linker and some of the alkyl containing groups are linked via an ester linker. The combination of ester and ether linkages have shown to increase the solubility of the lignin in carrier liquids, especially gas oils such as light gas oil. By functionalizing using different linkers the functionalization will be less dependent on the availability of the functional group and reagents but still obtain a soluble lignin product. Using different linkers may also make the process and the final product cheaper due to that the amount of more expensive reagents may be reduced but still obtain a soluble product for example.

The alkyl section of the alkyl containing group of the modified lignin may be a C1 or longer alkyl group, such as or C2 or longer, or a C3 or longer group, or C5 or longer, or C6 or longer, or C7 or longer, or C8 or longer, or C9 or longer, or C10 or longer, or C12 or longer, or C14 or longer, or C16 or longer. In one embodiment the alkyl section is a C10-C20 such as C16-C20. However one of the advantages of the present invention is that the lignin does not need to be functionalized with long alkyl chains in order to be dissolved in the green carrier liquid. Therefore in one embodiment the alkyl group is a C1 to C10 alkyl group such as C2 to C8. In one embodiment the lignin is acetylated.

In one embodiment the lignin is functionalized via an ester group using a fatty acid such as a C16-C20 fatty acid. The fatty acid is preferably an unsaturated fatty acid such as oleic acid.

The degree of modification or functionalization of the hydroxyl groups expressed as number of equivalents to lignin repeating units. The number of equivalents may be 0.1 or higher, or 0.2 or higher, or 0.3 or higher, or 0.4 or higher, or 1.0 or lower, or 0.9 or lower, or 0.8 or lower, or 0.7 or lower, or 0.6 or lower, or 0.5 or lower. In one embodiment the degree of modification is 0.1-0.5 such as 0.2-0.4. In this application the repeating unit of lignin is assumed to have a molecular weight of 180 g/mol.

One example of functionalizing lignin via an ester group is to use a modification agent or functionalization agent which may be a carboxylic acid or an anhydride. The esterification of the lignin may be performed in a solvent or in a carrier liquid. When the esterification is performed in a carrier liquid comprising a first fatty acid and together with an esterification agent such as an anhydride the obtained esterified lignin is believed to comprise ester groups derived from the anhydride alone but also ester groups derived from an anhydride bond to a first fatty acid. When the linker is an ether group the modification agent may be an epoxide.

The functionalized lignin according to the present invention may have a weight average molecular weight ($M_w$) of 1,000 g/mol or higher, or 1,200 g/mol or higher, or 1,500 g/mol or higher, or 1,800 g/mol or higher, or 2,000 g/mol or higher, or 2,500 g/mol or higher, or 3,500 g/mol or higher but less than 10,000 g/mol, or less than 6,000 g/mol, or less than 5,000 g/mol, or less than 4,500 g/mol. In one embodiment the number average molecular weight ($M_n$) is 1,500 to 5,000 g/mol, or 2,200 g/mol to 3,700 g/mol.

The amount of functionalized lignin in the composition may be 1-50 wt % (weight %) such as 2 wt % or more, or 3 wt % or more, or 5 wt % or more, or 10 wt % or more, but 40 wt % or less, or 30 wt % or less, or 20 wt % or less, or 15 wt % or less. Lower amounts of functionalized lignin make the composition more easy to pump and to high amounts of functionalized lignin may make the hydrotreatment less efficient. The composition may also comprise hydrotreated lignin obtained from another composition or method.

The composition is preferably free or essentially free of particles which may block or interfere with the catalyst in the hydrotreater which would reduce the flow through and the efficiency of the hydrotreater. The composition may in one embodiment be defined as not being a slurry. In one embodiment the composition is free of particles having a diameter of 5 mm or more, or 3 mm or more, or 1 mm or more, or 500 µm or more, or 300 µm or more, or 100 µm or more, or 50 µm or more, or 20 µm or more.

Solvents, Green Carrier Liquid and Carrier Liquids

According to the present invention the composition comprises a green carrier liquid which contains depolymerized functionalized lignin compounds, preferably derived from Kraft lignin. The green carrier liquid acts as a solvent and dissolves, fully or partly, the functionalized lignin. The composition of the green carrier liquid may be tuned or adapted in order to optimize the process relating to the degree of functionalization needed and the required alkyl chain length. This tuning may be done by allowing the green carrier liquid contain various amounts of heavy and light compounds. This provides a higher flexibility to the process since the process is then not so dependent on long chain alkyl functionalization agents such as fatty acids.

The green carrier liquid comprises depolymerized functionalized lignin compounds, which is a mixture of compounds derived from the functionalized lignin of the feed, but may also contain compounds derived from other compounds of the feed. By having a high content of compounds derived from renewable sources in the green carrier liquid the present invention provides a more environmentally friendly process. In one embodiment at least 50 wt % of the green carrier liquid is derived from a renewable source, preferably at least 80 wt % or at least 90 wt %.

The second product stream and the green carrier liquid may comprise petrol and diesel compounds. These compounds may be defined as depolymerized functionalized lignin compounds. Petrol compounds (gasoline compounds) may be defined as a mixture of mainly alkanes and alkenes having four to twelve carbons. Petrol compounds boils in the range of 40-200° C. Diesel compounds may be defined as a mixture of mainly saturated hydrocarbons having ten to fifteen carbons. Diesel compounds boils in the range of 180-360° C. The amount of petrol and diesel compounds in the second product stream depends on the hydrotreatment of the feed but it may be at least 5 wt %, or at least 15 wt %, or at least 30 wt %, or at least 50 wt %.

The mixture of compounds of the depolymerized functionalized lignin may comprise phenol derivatives or polyphenol derivatives such as phenol or polyphenols and an alkylphenol, alkyl alkoxyphenol or an alkoxyphenol. The phenol derivatives may have two or more hydroxyl groups. The polyphenols may be diphenols or triphenols for example. In one embodiment the mixture comprises phenol, alkylphenol, alkyl alkxoyphenol and alkoxyphenol.

The phenol derivative according to the present invention has the general structure according to formula (1)

(I)

wherein each R1 to R6 may be individually selected from hydrogen, hydroxyl group, an alkyl group, an alkoxy group and alkyl alkoxy group and wherein at least one of R1 to R6 is a hydroxyl group. In one embodiment R6 is a hydroxyl group. In one embodiment the phenol derivative is a diol or a diphenol and preferably the hydroxyl groups are in ortho position to each other. In one embodiment at least one of R1 to R6 is an alkoxygroup such as a C1-C5 alkoxygroup. In one embodiment an alkoxy group is in ortho position to the hydroxyl group. In one embodiment at least one of R1 to R6 is a C1-C10 alkyl group such as a C1-C5 alkyl group. In one embodiment at least one of R1 to R6 is a methyl group. In one embodiment R6 is a hydroxyl group and at least one of R1 or R5 is an alkoxy group, for example a methoxy group, and at least one of R2-R4 is a C1-C5 alkyl group such as a methyl group or ethyl group.

The polyphenol according to the present invention may have the general structure according to formula (2a) or (2b)

wherein each R' and R" is individually a C1-C5 alkyl group, preferably a C2-C3 alkyl group and wherein each $Ph_1$ to $Ph_3$ is a phenol derivative according to formula (1). The phenol derivatives (Ph) may be in ortho, meta or para position to each other.

The depolymerized functionalized lignin compounds are a mixture that may comprise phenol derivatives and polyphenol derivatives such as an alkylphenol, an alkyl alkoxy-phenol or an alkoxyphenol and a diphenol. The weight proportion of phenol derivatives to polyphenol derivatives in the mixture may be from 1:100 to 100:1 (phenol derivative: polyphenol derivative).

The depolymerized functionalized lignin compounds may also comprise compounds of higher molecular weight. These compounds, herein called oligomeric depolymerized functionalized lignin compounds (ODFLD), may have a molecular weight ($M_w$) of 400 g/mol or higher, or 600 g/mol or higher, but preferably not more than 1500 g/mol, or 1300 g/mol or lower, or 1000 g/mol or lower, or 800 g/mol or lower. The amount of ODFLD in the depolymerized functionalized lignin compound mixture may be 0-50 wt % such as 1 wt % or higher, or 5 wt % or higher, or 10 wt % or higher, or 45 wt % or lower, or 35 wt % or lower, or 25 wt % or lower, or 15 wt % or lower. The amount of ODFLD in the depolymerized functionalized lignin compound mixture may be adjusted in order to optimize the system and the method by changing the for example the amount of hydrogen and the temperature during the hydrotreatment. In one embodiment the depolymerized functionalized lignin compounds is a mixture of compounds wherein said mixture comprises at least 10 wt % of compounds having a boiling point of at least 220° C., or at least 250° C., or at least 260° C., or at least 280° C., or at least 300° C., or at least 330° C., or at least 350° C. In another embodiment the amount is at least 25 wt %, or at least 50 wt %.

The phenol derivatives or the polyphenol derivatives or the ODFL may still contain the functionalization of the functionalized lignin. In other words they may contain an alkyl containing group linked to the phenol or polyphenol derivative or ODFL via a linker.

The weight ratio between the depolymerized functionalized lignin compounds and the functionalized lignin is 1.1-100:1 such as 1.5-50:1, or 2-25:1.

Those heavy compounds that has a boiling point may be defined as compounds having a mean boiling point of at least 200° C., or at least 220° C. but may be less than 350° C., or less than 300, or less than 250° C. In one embodiment the mean boiling point is 200-350° C. The mixture may further comprise compounds that decompose before reaching their boiling point at atmospheric pressure. Furthermore the heavy compound fraction may contain light compounds or compounds that actually should be been removed from the first product stream. Some of the compounds of the heavy compound fraction may be removed and used such as lubricating oil or waxes.

However since distillation and other separation methods usually do not remove all the wanted compounds the remaining fraction, the second product stream, will contain light compounds even after the distillation. By having these light compounds, monophenols for example, in the green carrier liquid the degree of functionalization may be reduced and/or the length of the alkyl chain may be shorter. The green carrier liquid may therefore comprise compounds that have a boiling point below each of these temperatures. The boiling point of these light compounds may be less than 260° C., or 250° C. or less, or 240° C. or less. In one embodiment the amount of said light compounds in the green carrier liquid is 5 to 90 wt %, such as 10 wt % or more, or 20 wt % or more, or 30 wt % or more, or 40 wt % or more, but 80 wt % or less, or 70 wt % or less, or 60 wt % or less. In one embodiment the amount is 30 wt % or less, or 20 wt % or less, or 10 wt % or less, or 5 wt % or less, or 2 wt % or less, or 0.5 wt % or less.

The amount of green carrier liquid in the composition may be 1-99 weight % of the total weight of the composition. In one embodiment the amount of green carrier liquid is 95 weight % or less, or 85 weight % or less 75 weight % or less, or 70 weight % or less, or 65 weight % or less, or 60 weight % or less, but preferably 30 weight % or more, or 40 weight % or more, or 45 weight % or more, or 50 weight % or more, or 55 weight % or more of the total weight of the composition. In one embodiment the amount of green carrier liquid is 10-90 weight %, or 20-80 weight %. The green carrier liquid may also contain compounds obtained from hydrotreatment of other biomasses, or fatty acids, glycerides or triglycerides or mixtures thereof.

The amount of depolymerized functionalized lignin compounds in the green carrier liquid may be up to 100 weight % if the feed of functionalized lignin only contains functionalized lignin. If the feed contains a solvent such as a carrier liquid the amount of depolymerized functionalized lignin compounds is less than 100 weight %. In one embodiment the amount of depolymerized functionalized lignin compounds in the green carrier liquid is 8 weight % or higher, or 10 weight % or higher, or 20 weight % or higher, or 30 weight % or higher, or 40 weight % or higher, or 50 weight % or higher, or 60 weight % or higher, or 70 weight % or higher, or 80 weight % or higher, or 90 weight % or higher, or 95 weight % or higher. In one embodiment the amount of depolymerized lignin in the green carrier liquid is 70-100 weight % such as 75-99 weight %, or 80-95 weight %. The rest of the green carrier liquid may be compounds derived from a carrier liquid added to the feed composition, or compounds or solvents added to the green carrier liquid prior to mixing with the feed of functionalized lignin.

Since the depolymerized functionalized lignin compounds is derived from the functionalized lignin of the feed the amount of depolymerized functionalized lignin compounds in the composition is preferably higher than the amount of functionalized lignin.

According to the present invention the composition may further comprise an added solvent. This solvent may be added to the first feed of functionalized lignin or, prior to or during the mixing of the green carrier liquid with the second functionalized lignin feed (or any subsequent feed of functionalized lignin), or it may be added to the green carrier liquid prior to the mixing with the functionalized lignin.

The solvent may be a carrier liquid such as fatty acid, esterified fatty acid, glyceride, triglyceride or oil (hydrocarbon or mineral oil). In one embodiment the carrier liquid is a mixture of esterified fatty acid and an oil such as a hydrocarbon oil. In one embodiment the carrier liquid is a mixture of fatty acid and a hydrocarbon oil. In one embodiment the carrier liquid is gas oil or a mixture of a gas oil and a fatty acid. The fatty acid may be tall oil fatty acid (TOFA). The esterified fatty acid may be fatty acid methyl ester (FAME).

The amount of carrier liquid in the composition may be up to 99 wt %. However, since the present invention aims at reducing the need of carrier liquids, especially hydrocarbon and mineral oil, and instead aims at dissolving the functionalized lignin in a green carrier liquid the amount added carrier liquid is preferably as low as possible. In one embodiment the amount of carrier liquid is 90 wt % or less, or 80 wt % or less, or 70 wt % or less, or 60 wt % or less, or 50 wt % or less, or 40 wt % or less, or 30 wt % or less, or 20 wt % or less, or 10 wt % or less, or 1 wt % or more, or 5 wt % or more. In the first run or the first couple of runs a carrier liquid may be added in order to dissolve the functionalized lignin. Preferably the carrier liquid is a fatty acid, esterified fatty acid, glyceride or triglyceride.

The solvent may also be an organic solvent or a mixture of organic solvents. In one embodiment the solvent is a mixture of an organic solvent. The organic solvent may be but is not limited to oxygenates such as an ester, ether, alcohol, aldehyde, sulfoxide or ketone. Preferred solvents are C1-C10 alcohols, C1-C10 aldehydes, C2-C15 ketones, C2-C10 ethers, and C2-C10 esters. A non-limiting list of solvents is methanol, ethanol, propanol, isopropanol, glycerol, phenol, alkylphenols or diols and butyl ether such as tert-butyl methyl ether; diethyl ether, diglyme, diisopropyl ether, dimethoxyethane, diethylene glycol, diethyl ether, polyethylene glycol, 1,4-dioxane and tetrahydrofuran, methylated tetrahydrofuran, mesityl oxide, furfural, isophorone. Preferred C2-C10 esters are organic esters, aromatic or non-aromatic esters, examples of esters are benzyl benzoate, various acetates such as methyl acetate, ethyl acetate, cyclopentyl methyl ether and butyl acetate, various lactates such as ethyl lactates. Solvents that are similar to or may be converted into fuel or petrol are interesting when the composition is to be used for fuel preparation. Such solvents could be ketones, ethers or aldehydes. In one embodiment the solvent is a C2-C15 ketone such as a C4-C12 ketone or a C6-C8 ketone. In one embodiment the solvent is a C1-C10 aldehyde such as a C4-C9 aldehyde or C6-C8 aldehyde. In one embodiment the solvent is a C4-C10 ether. In one embodiment the solvent is a mixture of a C2-C15 ketone and a C1-C10 aldehyde. In one embodiment the solvent is or comprises mesityl oxide. In one embodiment the solvent is or comprises acetone. In one embodiment the solvent is or comprises acetophenone. In one embodiment the solvent is or comprises pentanone. In one embodiment the solvent is or comprises ethyl isopropyl ketone. In one embodiment the solvent is or comprises isophorone. In one embodiment the organic solvent is or comprises an aromatic aldehyde or a mixture containing an aromatic aldehyde for example furfural. In one embodiment the solvent comprises furfural or furfuryl alcohol. In one embodiment the solvent is or comprises benzaldehyde. In one embodiment the solvent is or comprises ethyl acetate. In one embodiment the solvent is a C1-C10 alcohol or a C1-C10 diol. In one embodiment the solvent is or comprises ethanol. In one embodiment the solvent is or comprises methanol. In one embodiment the solvent is or comprises isopropanol. In one embodiment the solvent is or comprises solketal. In one embodiment the solvent is or comprises phenol. In one embodiment the solvent is a C2-C10 ester. In one embodiment the solvent is or comprises tetrahydrofuran or methylated tetrahydrofuran. In one embodiment the solvent is or comprises 1,4-dioxane.

In one embodiment the solvent comprises a combination of C1-C10 alcohols, C2-C10 ethers and C2-C10 esters. In one embodiment the solvent comprises two C1-C10 alcohols for example ethanol and glycerol, and in another embodiment the solvent comprises propanol and glycerol. In one embodiment the solvent comprises polyethylene glycol and a C1-C10 alcohol. When the solvent is a mixture of an organic solvent and water the mixture may contain methanol and water, ethanol and water, isopropanol and water or ethyl acetate and water, preferably ethanol and water, isopropanol and water and ethyl acetate and water.

In one embodiment the solvent is a mixture of a C2-C15 ketone such as a C4-C12 ketone or a C6-C8 ketone or a C1-C10 aldehyde such as a C4-C9 aldehyde or C6-C8 aldehyde and an alcohol. In one embodiment the solvent is a mixture of a C1-C10 alcohol such as a C3-C8 alcohol and an aldehyde.

In one embodiment the amount of added organic solvent in the composition is 1-99 weight % of the total weight of the composition. In one embodiment the amount of solvent is 10-60 weight %, or 20-50 weight %. In one embodiment the amount of organic solvent is 70 weight % or less, or 40 weight % or less, or 20 weight % or less, or 10 weight % or less, or 5 weight % or less, or 2 weight % or less of the total weight of the composition. In one embodiment the composition does not comprise any added organic solvent.

Method of Treating the Composition

The method according to the present invention aims at preparing compounds of fuel grade that may be used as fuel components or additives to fuels or compounds that may be further refined in a hydrotreater or a catalytic cracker for example. The method is schematically disclosed in FIGS. 1 and 4 and comprises providing a first feed of functionalized lignin which may be in dry or liquid form or a solution. The functionalized lignin is then mixed with a green carrier liquid that at least partly dissolves the functionalized lignin and forms a first feed composition. This may be done using any suitable kind of mixer. During start up the functionalized lignin may be dissolved in a solvent. The functionalized lignin feed composition (first or subsequent feed composition) may comprise functionalized lignin dissolved or partly dissolved in a green carrier liquid and optionally a solvent such as a carrier liquid or an organic solvent or a combination thereof. The first feed composition may comprise functionalized lignin and an organic solvent or a mixture of organic solvents, or it may comprise functionalized lignin and a carrier liquid, or functionalized lignin and a green carrier liquid. The first feed may be prepared at a temperature of at least 50° C. or higher, or 70° C. or higher, or 90° C. or higher.

Figure 4:
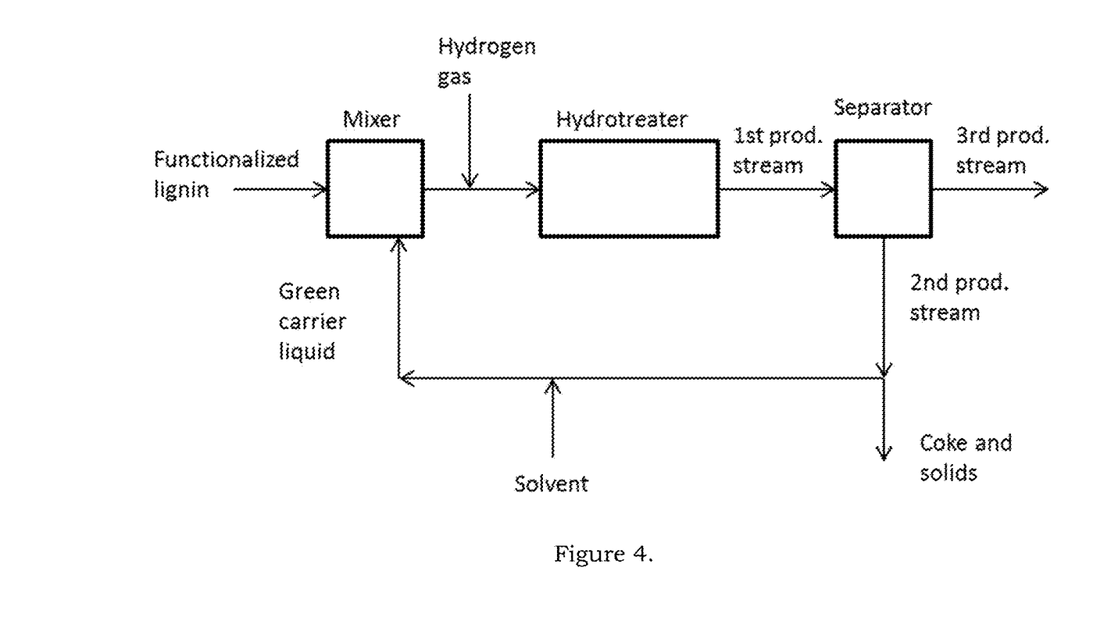
FIG. 4, schematic overview of the present invention

The first feed composition is introduced into a hydrotreater where the composition is hydrotreated or partially hydrotreated using any suitable hydrotreating technique forming a first product stream comprising light compounds and heavy compounds. Both the light and heavy compounds may comprise depolymerized functionalized lignin compounds. The ratio of light compounds and heavy compounds depends on the hydrotreating conditions such as time, temperature, pressure, catalyst and hydrogen donor.

The first product stream is then divided or split into two new product streams, a second product stream and a third product stream. In FIG. 4 this is illustrated by the separator. These two new product streams may contain essentially the same compounds. The second and the third product streams may be formed by withdrawing or pouring off or decanting a fraction of the first product stream where the withdrawn/poured/decanted fraction becomes the second or third product stream. In one embodiment the third product stream is formed by removing the light compounds (denoted "Gasoline" and "Diesel" in FIG. 1), for example by distillation or evaporation, and leaving a second product stream (denoted "green carrier liquid" in FIG. 1) comprising the heavy compounds of the depolymerized functionalized lignin compounds and maybe also some light compound residues. The third product stream may be further treated using an additional hydrotreating step or a catalytic cracking step for example.

Any unwanted compounds in the second product stream may be removed using any suitable techniques. The remaining compounds, the heavy compounds, are then used to prepare the green carrier liquid. If no compounds are removed from the second product stream said stream may be used as the green carrier liquid.

The green carrier liquid may comprise compounds that are derived from non-renewable sources such as hydrocarbon oil or mineral oil. To the green carrier liquid may also other compounds be added in order to increase the solubility of the functionalized lignin or in order to improve for example the hydrotreating process. Fatty acids or esterified fatty acids may for example be added to the green carrier liquid prior to mixing it with the next feed of functionalized lignin.

In order to prepare a fuel or fuel grade compounds with a high degree of "green" compounds (compounds derived from renewable sources) the amount of hydrocarbon oil or mineral oil or similar non-renewable sources should be kept as low as possible in the feed composition.

A second feed of functionalized lignin is then provided and mixed with the green carrier liquid from the second product stream to form a second feed composition. The green carrier liquid at least partly dissolves or fully dissolves the functionalized lignin of the second feed making the lignin more susceptible to hydrotreatment making the hydrotreatment more efficient in comparison with a slurry of lignin. The second feed composition of functionalized lignin may be prepared as the first feed composition of functionalized lignin and may comprise the same solvent or mixture of solvents as the first feed of lignin. This is of course also true for every subsequent feed composition.

The feed composition entering the hydrotreater is preferably a fully dissolved solution. The feed is also preferably essentially free from particles. FIG. 1 discloses a schematic view of the method and the compounds and temperatures disclosed in the figure are only examples and should not be seen as limiting. The method may be adapted by the skilled person in order to prepare a first and a second and a subsequent product stream which contains the wanted compounds.

Performing hydrotreating over a series of packed beds instead of powdered catalysts in a slurry gives much greater possibilities to control the hydrotreating process. Different catalytic materials can be placed in different positions in the beds to give optimal performance. The hydrogen flow and temperature can be optimized for each bed to give the optimal degree of hydrotreating and product properties.

The hydrotreater used in the present invention may be a fixed bed hydrotreater. The hydrotreater reactor may comprise one or more fixed beds where each bed may contain different catalysts. The system may also contain a guard bed arranged prior to or inside the reactor in order to remove metals and optionally also a particle filter arranged at the inlet or prior to the inlet of the hydrotreater.

The mixing of the green carrier liquid with the second feed of functionalized lignin may be done at a temperature of at least 50° C. or higher, or 70° C. or higher, or 90° C. or higher. The mixing may be done using stirring or shaking or any other suitable method. The mixing may be an extraction step where the green carrier liquid extracts lignin from a composition (dry or in liquid form) comprising the functionalized lignin.

The method according to the present invention may be operated continuously, in other words a more or less continuous second feed of functionalized lignin (dry or in liquid phase) may be mixed as described herein with the continuously prepared green carrier liquid comprising depolymerized functionalized lignin compounds. The green carrier liquid may vary slightly for each cycle and may comprise different compounds or may comprise different ratios of the compounds for each cycle.

The addition of the hydrogen gas or hydrogen donor (H-donor) may be done in the hydrotreater or prior to feeding the functionalized lignin or functionalized lignin containing mixture into the hydrotreater.

The present invention provides a method of preparing light compounds from lignin without the need to add fossil fuels or oils, or the use of fatty acids derived from crops. By hydrotreating functionalized lignin the method prepares a solvent for dissolving functionalized lignin. The present invention is also believed to result in high yield of high valuable products and low coke formation. By adjusting the parameters of the method such as temperature, time, pressure and catalyst the present method may be adapted to obtain specific products from the hydrotreatment step so that the first product stream contains the wanted products and the second product stream contains compounds that dissolve functionalized lignin.

Hydrotreating and Cracking

Hydrotreating and catalytic cracking are common steps in the oil refinery process where the sulfur, oxygen and nitrogen contents of the oil is reduced and where high-boiling, high molecular weight hydrocarbons are converted into gasoline, diesel and gases. During hydrotreating the feed is normally exposed to hydrogen gas (for example 20-200 bar) and a hydrotreating catalyst (NiMo, CoMo or other HDS, HDN, HDO catalyst) at elevated temperatures (200-500° C.). The hydrotreatment process results in hydrodesulfurization (HDS), hydrodenitrogenation (HDN), and hydrodeoxygenation (HDO) where the sulphurs, nitrogens and oxygens primarily are removed as hydrogen sulfide, ammonia, and water. Hydrotreatment also results in the saturation of olefins. Catalytic cracking is a category of the broader refinery process of cracking. During cracking, large molecules are split into smaller molecules under the influence of heat, catalyst, and/or solvent. There are several sub-categories of cracking which includes thermal cracking, steam cracking, fluid catalyst cracking and hydrocracking. During thermal cracking the feed is exposed to high temperatures and mainly results in homolytic bond cleavage to produce smaller unsaturated molecules. Steam cracking is a version of thermal cracking where the feed is diluted with steam before being exposed to the high temperature at which cracking occurs. In a fluidized catalytic cracker (FCC) or "cat cracker" the preheated feed is mixed with a hot catalyst and is allowed to react at elevated temperature. The main purpose of the FCC unit is to produce gasoline range hydrocarbons from different types of heavy feeds. During hydrocracking the hydrocarbons are cracked in the presence of hydrogen. Hydrocracking also facilitates the saturation of aromatics and olefins.

In one embodiment of the present invention the hydrotreatment comprises treating the functionalized lignin with hydrogen gas or a hydrogen donor. The hydrogen donor may for example be formic acid or an alcohol or a combination thereof. A non-limiting list of suitable alcohols is methanol (MeOH), ethanol (EtOH), propanol, iso-propanol (i-PrOH), glycerol, glycol, butanol, t-butanol (i-BuOH) or combinations thereof. The hydrogen gas may be provided or added in the hydrotreater or to the feed prior to entering the hydrotreater.

The pressure in the reactor during the hydrotreatment may be 5 to 400 bar such as 50 bar or higher, or 100 bar or higher, or 300 bar or lower, or 200 bar or lower, or 150 bar or lower. In one embodiment the hydrogen pressure is 20-200 bar, such as 50-100 bar, or 60-90 bar. Since water is generated during the hydrogenation a large amount of energy is released. The hydrotreatment may be performed at a temperature of not more than 500° C., or not more than 400° C., preferably not more than 300° C., or not more than 200° C., preferably at 100° C. or higher, or 150° C. or higher. In one embodiment the hydrotreatment is done at a temperature of 200 to 350° C.

In one embodiment the hydrotreatment is performed in the presence a HDS, HDN or HDO catalyst comprising a transition metal catalyst. For example the transition metal catalyst may be Al, W, Ir, Re, Ni, Mo, Zr, Co, Ru, Rh, Pt or Pd based catalyst. For example Raney nickel, nickel on carbon, Ni/Si, Ni/Fe, Nickel nanopowder, zeolite, amorphous silica-alumina, Pd/C, NiMo, NiW or CoMo or a combination thereof. In one embodiment the catalyst is a NiMo or a CoMo catalyst.

The components of the feed composition will be influenced differently when subjected to the hydrotreatment process. The transformation of the functionalized lignin may be incremental and may require more than one pass through the hydrotreater before forming a fully deoxygenated product or light compounds having a boiling of 350° C. or lower, or 300° C. lower, or 280° C. or lower, or 250° C. or lower. On the first pass the functionalized lignin will partially be deoxygenated and depolymerized. Most of the formed compounds will be separated as heavy compounds and will be recycled or returned for a second pass through the hydrotreater. On the second pass through the hydrotreater it is more likely that larger amounts of fully deoxygenated products form, i.e. liquid petroleum gas (LPG) and liquid fuel. By adjusting the distillation parameter the middle distillates (diesel) can either form product or be recirculated for one more pass through the hydrotreater. Due to partial hydrocracking the recirculated fraction will eventually form LPG and light liquid fuel.

Figure 3:
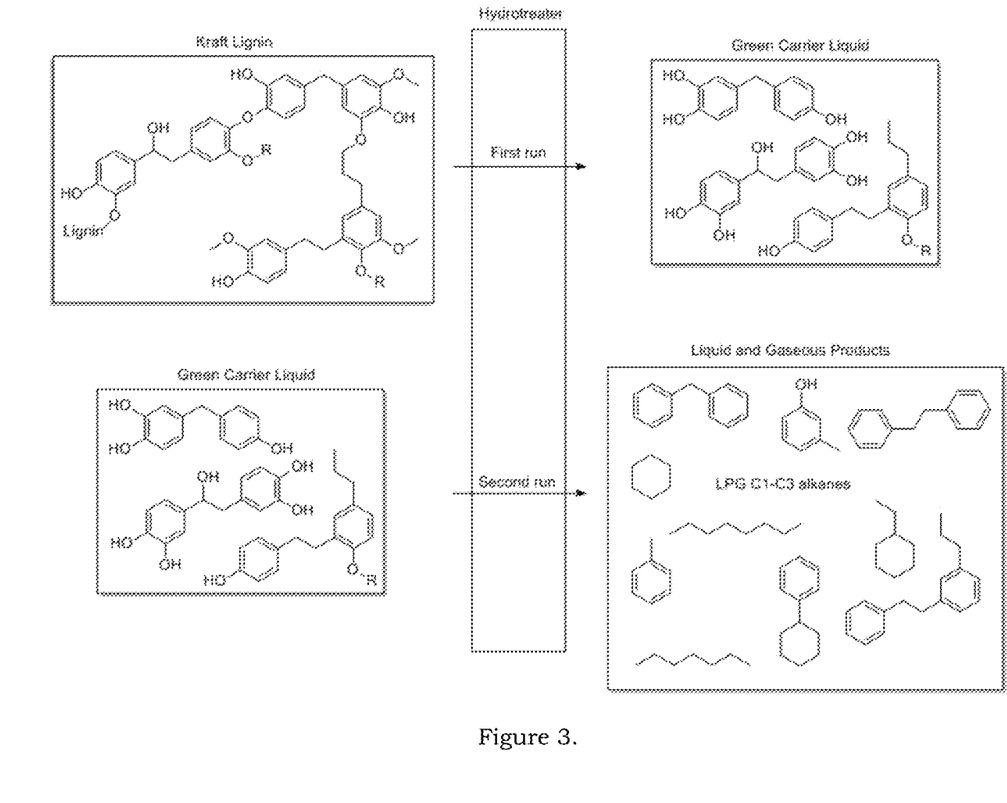
FIG. 3, a schematic disclosure of the effect of hydrotreating on different materials of the feed.

The hydrotreatment may be performed until the amount of wanted products is obtained. FIG. 3 discloses schematically the hydrotreatment products obtained when treating different materials.

Dividing, Separation and Distillation

The first product stream formed during hydrotreatment comprises light compounds and heavy compounds which both may contain depolymerized functionalized lignin compounds. In the next step the first product stream is divided into a second product stream and a third product stream.

The dividing (illustrated as the separator in FIG. 4) of the first product stream may be done by removing the light compounds from the first product stream to form a third product stream leaving a second product stream comprising the heavy products and may be also some light compound, particles and coke. The removal of the light products may be done by distillation or evaporation under reduced or at atmospheric pressure.

However by dividing the first product stream by for example withdrawing or pouring off a fraction or a part of the first product stream the two formed product streams (second and third) will contain essentially the same liquid compounds. The solid particles and coke will probably remain in one of the two new product streams. In one embodiment the coke and/or the solid particles are found in the second product stream and may be removed in a subsequent step.

The third product stream may comprise petrol and diesel compounds. These compounds may be defined as depolymerized functionalized lignin compounds. Petrol compounds (gasoline compounds) may be defined as a mixture of mainly alkanes and alkenes having four to twelve carbons. Petrol compounds boils in the range of 40-200° C. Diesel compounds may be defined as a mixture of mainly saturated hydrocarbons having ten to fifteen carbons. Diesel compounds boils in the range of 180-360° C. In one embodiment both the second and the third product stream contains petrol and diesel compounds.

The heavy products comprise depolymerized functionalized lignin compounds but may also comprise compounds obtained from the hydrotreatment that are not derived from the functionalized lignin. Instead these compounds may come from a carrier liquid added to the feed composition.

The separation of the light compounds should be done so that the optimal heavy compounds of the second product stream are obtained. In other words the separation or distillation of the first product stream should be optimized based on the heavy compounds and not on the light compounds. The reason is of course that the heavy compounds needs to contain the optimal compounds to dissolve the next feed of functionalized lignin.

The amount of the first product stream that is used as green carrier liquid may be at least 20%, or at least 40%, or at least 60%, or at least 70%, or at least 80%, or at least 85% or at least 90% but less than 100%, or less than 95%.

In order for the method according to the present invention to be effective the amount of heavy compounds should be at least 50 wt % of the first product stream, preferably at least 60 wt % since the heavy compounds will probably contain coke and solid particles that are preferably removed and will not be part of the green carrier liquid to be mixed with the next feed of functionalized lignin. It is well known in the art that even light compounds will be present in the heavy compound fraction after distillation.

The light compounds contains at least some of the wanted fuel grade carbon compounds which may be used as a liquid fuel (diesel or petrol for example) or as an additive to a liquid fuel. The light compounds may contain kerosene (may be used in aviation fuel) and BTX compounds (Benzene, Toluene, Xylene) and therefore the method is also suitable to prepare such compounds.

FIG. 3 discloses a schematic view of the present invention where the different distillation temperature intervals for the compounds, light and heavy, are shown. The specific compounds and distillation temperatures are only illustrative and should not be seen as limiting.

Coke and particles are preferably removed from the product stream (first or second) by using any suitable technique such as filtration, decantation, sedimentation or centrifugation.

The invention claimed is:

1. A method of preparing a composition, wherein the method comprises:
   a. providing a first feed of functionalized lignin having a weight average molecular weight ($M_w$) of at least 1,000 g/mol wherein the functionalized lignin is functionalized with an alkyl containing group via linker group wherein the linker is an ether or an ester and;
   b. providing a solvent or a green carrier liquid or a mixture thereof which at least partly dissolve the functionalized lignin;
   c. dissolving the functionalized lignin in the solvent or green carrier liquid forming a first feed composition;
   d. hydrotreating or partially hydrotreating the first feed composition forming a first product stream comprising light compounds and heavy compounds in a fixed bed hydrotreater;
   e. dividing the first product stream into a second product stream and a third product stream;
   f. optionally removing unwanted compounds from the second and/or third product stream, the unwanted compounds including at least one of coke or solid particles;
   g. providing a green carrier liquid comprising the second product stream and optionally a solvent, wherein the green carrier liquid comprises depolymerized functionalized lignin compounds comprising petrol and diesel compounds in an amount of at least 5 wt %
   h. providing a second feed of functionalized lignin; and
   i. mixing the green carrier liquid with the second feed of functionalized lignin forming the composition,
   wherein the composition comprises functionalized lignin having a weight average molecular weight ($M_w$) of at least 1,000 g/mol and the green carrier liquid comprising depolymerized functionalized lignin compounds and wherein the depolymerized functionalized lignin compounds comprises petrol and diesel compounds in an amount of at least 5 wt %,
   wherein the functionalized lignin is dissolved in the green carrier liquid, and
   wherein the amount of the depolymerized functionalized lignin compounds in the composition is higher than the amount of the functionalized lignin.

2. The method according to claim 1 wherein the dividing the first product stream into the second product stream and the third product stream comprising the light compounds includes removing the light compounds from the first product stream leaving the second product stream comprising heavy compounds.

3. The method according to claim 1 wherein the division of the first product stream into the second product stream and the third product stream is done by withdrawing or decanting a part of the first product stream.

4. The method according to claim 1 wherein the solvent is a carrier liquid and the first feed of functionalized lignin is at least partly dissolved in the carrier liquid selected from fatty acid, esterified fatty acid, glyceride, triglyceride, a mineral or hydrocarbon oil or a mixture thereof.

5. The method according to claim 1 wherein the hydrotreating is performed together with a HDS, HDN or HDO catalyst comprising a transition metal catalyst.

6. The method according to claim 1 wherein the hydrotreating is performed at a temperature of not more than 500° C., not more than 400° C., not more than 300° C., not more than 200° C., 100° C. or higher, or 150° C. or higher.

7. The method according to claim 1 wherein the hydrotreating is performed at a pressure of 5 to 400 bar.

8. The method according to claim 1 wherein the lignin is functionalized via an ester group and wherein the alkyl section is a C5 or longer, C10 or longer, or C16 or longer.

9. The method according to claim 1 wherein the depolymerized functionalized lignin compounds is a mixture of compounds wherein said mixture comprises at least 10 wt % of compounds having a boiling point of at least 220° C., or at least 250° C., or at least 280° C., or at least 300° C., or at least 330° C., or at least 350° C.

10. The method according to claim 1 wherein the light compounds removed from the first product stream comprises compounds not having a boiling higher than 250° C., or not higher than 220° C., or not higher than 200° C.

* * * * *